(12) United States Patent
Ginsburg

(10) Patent No.: US 6,303,857 B1
(45) Date of Patent: Oct. 16, 2001

(54) MAST LIGHTING SYSTEM

(75) Inventor: Thomas A. Ginsburg, Southlake, TX (US)

(73) Assignee: D.O.T. Connectors, Inc., Haltom City, TX (US)

( * ) Notice: Subject to any disclaimer, the term of this patent is extended or adjusted under 35 U.S.C. 154(b) by 0 days.

(21) Appl. No.: 09/421,081

(22) Filed: Oct. 19, 1999

Related U.S. Application Data

(60) Provisional application No. 60/104,796, filed on Oct. 19, 1998.

(51) Int. Cl.$^7$ .................................................. E04H 12/00
(52) U.S. Cl. ............................... 174/45 R; 52/726.4
(58) Field of Search .......................... 174/45 R, 40 TD, 174/40 R, 43, 44, 45 TD, 163 F, 163 R; 52/726.4

(56) References Cited

U.S. PATENT DOCUMENTS

| | | |
|---|---|---|
| 342,552 | 5/1886 | Westinghouse . |
| 946,251 | 1/1910 | Moffitt et al. .................. 337/192 |
| 1,157,026 | 10/1915 | Meschenmoser ................ 439/252 |

(List continued on next page.)

FOREIGN PATENT DOCUMENTS

| | | |
|---|---|---|
| 30 36 629 A1 | 9/1980 | (DE) . |
| 0 334 610 B1 | 3/1994 | (EP) . |
| 0 334 609 B1 | 6/1994 | (EP) . |
| 1438539 | 4/1966 | (FR) . |

OTHER PUBLICATIONS

Florida Department of Transportation, Metal Pole Wiring Specifications, (8/78).
Bachanan Construction Products, Inc., Catalog, Waterproof Breakaway Streetlight Connector and Splice Insulating Kits (undated).
Buss Protection, Catalog, Small Dimension Fuses, Fuseholders, Blocks and Accessories (undated).
Bussmann, Catalog, Fuseblocks, Holders and Disconnect Switches (undated).
Littelfuse, Catalog, Axial Lead and Cartridge Fuses (undated).
ITT Cannon, Catalog, Sure Seal Connectors and Accessories (undated).
General Electric Company, Airport Lighting—High Intensity Runway; Runway and Threshold Marker Lights (Feb. 4, 1952).
State of Louisiana, Department of Highways, Standard Specifications for Road and Bridges, (10/71).
Buss, Tron In–Line Waterproof Fuse Holders with Optional Break–A–Way Receptacles for Street & Highway Lighting Standards, (6/84).

(List continued on next page.)

*Primary Examiner*—Dean A. Reichard
*Assistant Examiner*—Adolfo Nino
(74) *Attorney, Agent, or Firm*—Needle & Rosenberg, P.C.

(57) ABSTRACT

An improved mast lighting system of the type including at least one mast having a proximate end and an opposite distal end, the distal end capable of supporting an electrical component and the proximate end mounted to a foundation that has at least a portion extending into the ground, an electrical cable within the mast connecting the electrical component to a distribution component assembly through an electrical connector, and a power source connected to the distribution component assembly. The foundation has a chamber therein of sufficient dimensions to receive the distribution component assembly. The distribution component assembly is disposed within the chamber. The mast defines an opening therein adjacent the proximate end, in communication with the chamber. Thus, the distribution component assembly is protected from collision damage by the foundation, but is accessible to the user through the opening in the mast.

13 Claims, 4 Drawing Sheets

U.S. PATENT DOCUMENTS

| | | | |
|---|---|---|---|
| 1,162,657 | 11/1915 | Schweitzer | 336/58 |
| 1,189,459 | 7/1916 | Lundin | 174/45 R |
| 1,338,028 | 4/1920 | Linehan | 40/608 |
| 1,560,289 | 11/1925 | Noll | 362/431 |
| 1,776,682 | 9/1930 | King . | |
| 2,668,888 | 2/1954 | Johnson | 200/129 |
| 2,775,745 | 12/1956 | Eaton | 339/91 |
| 3,116,386 | 12/1963 | Sperzel | 200/115.5 |
| 3,145,329 | 8/1964 | Deakin et al. | 317/234 |
| 3,187,175 | 6/1965 | Lang . | |
| 3,225,224 | 12/1965 | Rydbeck . | |
| 3,242,252 | 3/1966 | Bergenstein | 174/38 |
| 3,300,570 | 1/1967 | Spiece et al. | 174/38 |
| 3,356,806 | 12/1967 | Urani | 200/129 |
| 3,364,635 | 1/1968 | Guggemos . | |
| 3,417,359 | 12/1968 | Urani . | |
| 3,518,600 | 6/1970 | Urani . | |
| 3,710,296 | 1/1973 | Urani | 337/213 |
| 3,753,192 | 8/1973 | Urani . | |
| 3,760,234 | 9/1973 | Jones et al. . | |
| 3,761,865 | 9/1973 | Bomgaars et al. | 339/60 R |
| 3,862,411 | 1/1975 | Persson | 240/25 |
| 3,863,189 | 1/1975 | Urani | 337/213 |
| 3,945,320 | 3/1976 | Gibson et al. | 102/27 R |
| 4,072,857 | 2/1978 | De Vicaris | 362/123 |
| 4,138,181 | 2/1979 | Hacker et al. | 339/45 R |
| 4,214,806 | 7/1980 | Kraft | 339/242 |
| 4,237,530 | 12/1980 | Murray et al. . | |
| 4,392,192 | 7/1983 | Steadman . | |
| 4,542,437 | 9/1985 | Ellis et al. . | |
| 4,568,137 | 2/1986 | Leuthold | 339/147 R |
| 4,617,768 | 10/1986 | Gebelius . | |
| 4,684,192 | 8/1987 | Long et al. | 439/374 |
| 4,698,717 | 10/1987 | Scheid | 361/1 |
| 4,702,537 | 10/1987 | Mattingly et al. | 439/152 |
| 4,707,046 | 11/1987 | Strand | 439/314 |
| 4,734,059 | 3/1988 | Melugin | 439/621 |
| 4,759,730 | 7/1988 | Sappington et al. | 439/622 |
| 4,827,389 | 5/1989 | Crum . | |
| 4,836,802 | 6/1989 | Phillips | 439/622 |
| 4,878,160 | 10/1989 | Reneau et al. | 362/269 |
| 4,909,761 | 3/1990 | Muguira . | |
| 4,911,652 | 3/1990 | Savoca et al. | 439/282 |
| 4,914,258 * | 4/1990 | Jackson | 174/45 R |
| 4,968,264 | 11/1990 | Ruehl et al. | 439/622 |
| 4,997,394 | 3/1991 | Katz et al. | 439/622 |
| 5,018,991 | 5/1991 | Katz et al. | 439/621 |
| 5,060,437 | 10/1991 | Parsons et al. | 52/298 |
| 5,069,631 | 12/1991 | Bauer et al. | 439/159 |
| 5,080,600 | 1/1992 | Baker et al. | 439/258 |
| 5,161,874 | 11/1992 | Benes | 362/32 |
| 5,243,508 | 9/1993 | Ewing et al. | 362/431 |
| 5,267,880 | 12/1993 | Tamm | 439/622 |
| 5,335,160 | 8/1994 | Savoca | 362/431 |
| 5,483,019 * | 1/1996 | Tourigny | 174/45 R |
| 5,726,507 * | 3/1998 | Tipton | 174/45 R |
| 5,820,255 | 10/1998 | Carrington et al. | 362/431 |

OTHER PUBLICATIONS

Light Pole Installation, (11/86).
Breakaway and Tap Connector Diagrams (11/86).
Bussman, Buss Electronic Fuses and Small Dimension Fuses, (4/86).
Buchanan, Buchanan Technical Data Sheets, (10/88).
Breakaway Transformer Base and Light Pole Connections, (3/90).
Littelfuse, Catalog, (2/73).
Bussman, TRON Breakaway Fuseholder Assembly, (2/73).
Roger L. Brockenbrough; Kenneth K. Broedecker, Highway Engineering Handbook Building and Rehabilitating the Infrastructure (1996) (pp. 7.96–7.138).
Bussman, TRON In–the–Line Waterproof Fuseholder, (undated).
$MG^2$, Duraline, Modular Cable Distribution System—A Safer Alternative to Roadway and Highmast L Lightpole Wiring, (undated).
Littelfuse PowrGard Products Catalog (1993).
Bussman, Cooper Industries, Buss Electronic and Small Dimension Fuses Catalog SFB Jun. 1983 (As seen on upper corner of last pg.).
Homac Manufacturing Company Product Catalog (Mar. 1987).
Buchanan Construction Products, Inc. Catalog (1995).
Florida Department of Transportation, Lighting Pole Details (undated).
Amerace Corporation, Elastimold 600 Volt Waterproof Connector Kits Catalog, Rev. 1 (Dec. 1984).
State of California Dept. of Transportation Standard Plans and Specifications (1999, 1997, 1995, 1992 and 1988).
Montana Dept. of Highways & Montana Highway Commission, Standard Specifications for Road and Bridge Construction, 1987 Edition (effective Jan. 1, 1987).
Montana Dept. of Highways & Dept. of Transportation Federal Aid Projects Specifications (1989–1992).
Buchanan, Buchanan Construction Products Catalog, (Undated).

* cited by examiner

MAST LIGHTING SYSTEM

RELATED U.S. APPLICATION DATA

This application claims priority to U.S. provisional application Serial No. 60/104,796 filed on Oct. 19, 1998. The 60/104,796 provisional patent application is herein incorporated by this reference in its entirety.

BACKGROUND

1. Field of the Invention

The invention relates to mast mounted outdoor lighting systems for illuminating roadways, sidewalks, parking lots or the like, and specifically to an improved mast mounted lighting system wherein a watertight casing containing power distribution components is stored within the mast foundation and is accessible by the user through the base of the mast.

2. The Prior Art

Outdoor mast lighting systems are well known in the prior art. Such systems commonly are supported above the surface to be lighted by a long pole or mast. Masts are typically hollow, and may be round, square or of any selected cross-sectional shape which provides adequate stability. The mast may include a breakaway base at its lower end having an opening (or "handhole") therein, through which the interior of the mast may be accessed by maintenance or installation personnel. The mast is mounted on a foundation of concrete or other suitable material set permanently into the ground and may be affixed to the foundation by a plurality of anchor bolts set into the foundation, which engage corresponding holes in the breakaway base.

Suspended at the top of the mast is an electrical component, commonly an electric light. In some applications, a cantilevered secondary mast supports the light over a street or sidewalk. In other applications, a ring of high-intensity lamps may be supported radially around the distal end of the mast. The electrical component is electrically connected to a power source, generally in series with a plurality of other commonly powered mast units in a given area.

Power delivery to each mast unit in a commonly powered system has been accomplished in a variety of ways in the prior art. In one such system, the output of a master circuit breaker may be connected to an electric power cable which runs to the base of the mast unit. The power cable connects to a fuse and surge arrestor assembly disposed within the hollow mast, which prevent current surges caused by lightning, voltage spikes or other anomalies from damaging the light fixture or the master circuit breaker. Access to the fuse and surge arrestor assembly is commonly provided by locating that assembly adjacent a handhole in the mast.

The performance of such a system is impaired by several shortcomings. Wire and cable attachments are generally made by splices, which are vulnerable to failure when tensile forces are applied to the connections. Because of the vertical orientation of the cable sections, gravitational forces are exerted at all times on the spliced connections which may tend to come apart. In catastrophic failure, such as that caused by a collision by an automobile or truck, the spliced connections are likely to disconnect, causing an interruption in service throughout the grid, and exposing dangerously "hot" wires.

In another prior art system, the fuse and surge arrestor assembly is located in a remote underground manhole. Such a system requires significantly greater expense and space to install, as a remote hole must be dug and maintained for each lighting unit within the grid, and additional cable is required to accommodate the remotely located electrical components.

SUMMARY OF THE INVENTION

The disadvantages of the prior art are overcome by the present invention which, in one aspect, is an improved mast lighting system. The improved lighting system includes at least one mast having a proximate end and an opposite distal end. The distal end is capable of supporting an electrical component, such as a street lamp, and the proximate end is mounted to a foundation, at least a portion of which extends into the ground. Within the foundation is a chamber of sufficient dimensions to receive within a distribution component assembly which may include fuses and a surge arrestor. An electrical cable within the mast connects the electrical component to the distribution component assembly through an electrical connector. In turn, the distribution component assembly is electrically connected to a power source which provides power to the mast lighting system. In the proximate end of the mast, an opening in communication with the chamber provides the user access to the distribution component assembly.

In another aspect, the invention includes an improved mast lighting system, wherein the electrical connector is a breakaway connector set having a first connection and a second connection. A casing is provided, which encloses the distribution component assembly and is disposed within the chamber. A selected one of the first or second connection is disposed on the casing and electrically connected to the distribution component assembly.

In another aspect, the invention includes a casing having an aperture therethrough, and a closure member capable of selectively engaging the aperture in a sealing watertight manner. The casing has a plurality of ports therethrough capable of sealingly engaging an insulated wire passing therethrough.

In another aspect, the invention includes a casing having a space therein capable of receiving the distribution component assembly and including at least one fuse port. The fuse port is located on the casing and receives a fuse therein which is electrically connected to the distribution component assembly. A fuse cap for the fuse port is provided, as well as means for sealingly engaging the fuse cap to the fuse port.

In another aspect, the method of the invention includes an improved method of constructing a mast lighting system, including disposing the distribution component assembly within the chamber, electrically connecting the power source to the distribution component assembly, and electrically connecting the distribution component assembly to the electrical cable.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
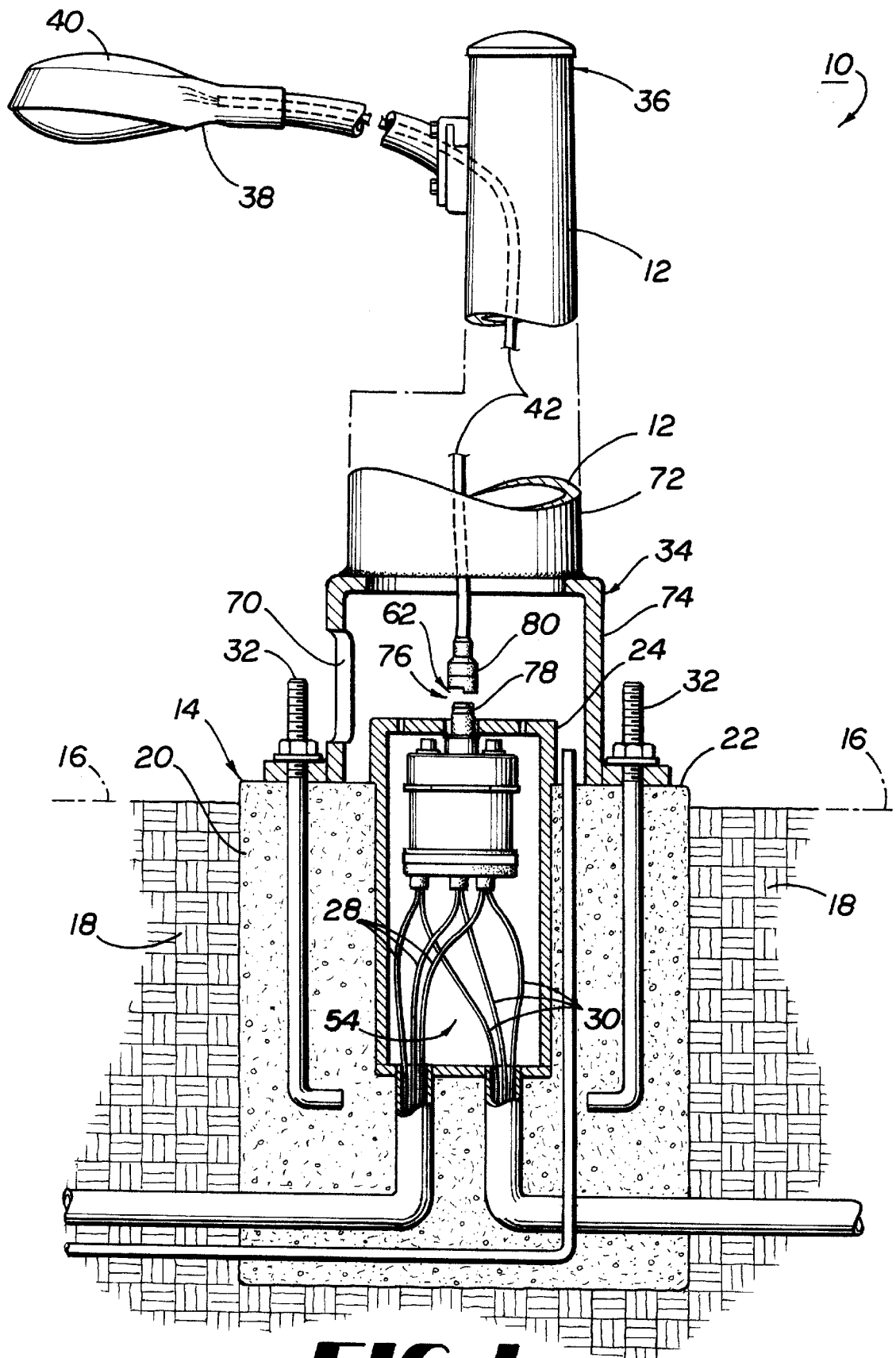
FIG. 1 is a side view of an embodiment of the improved mast lighting system with a portion shown in vertical cross-section.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring first to FIG. 1, an improved mast lighting system 10 is described, of the type having at least one mast 12 mounted to a foundation 14. At least part of the foundation 14 extends below the grade 16 of the surrounding ground 18, whether installed in a parking lot, highway shoulder, sidewalk, or other environment. The foundation 14 commonly includes a pedestal 20 of concrete, but may be constructed of other materials capable of providing a stable base for the lighting system 10. The horizontal upper surface 22 of the pedestal 20 is at or above the level of the surrounding grade 16. The pedestal 20 is poured around a central conduit 24 through which underground electrical feeder wires 28, 30 are extended. The incoming feeder wires 28 convey electrical power to the lighting unit, either from a common power source (a remote circuit breaker, not shown) or from the outgoing feeder wires 30 of an adjacent lighting unit (not shown).

The mast 12 is rigidly attached to the pedestal 20 by welding, by a plurality of anchor bolts 32, or other standard connections. The portion of the anchor bolts 32 set into the concrete pedestal 20 that vertically extend above the surface 22 may provide added protection to components in the central conduit 24 from side impact with the pedestal 20, as from an automobile collision. Such protection may also be provided by a variety of protection systems fixed to the pedestal 20, such as a stable collar or other guardrail (not shown) extending around the central conduit 24. As defined in this specification, the term "foundation" is intended to include the pedestal 20 and any anchor bolts 32 or other such devices which provide protection from side impact to the pedestal 20 and central conduit 24.

The mast 12 is commonly constructed of tubular aluminum, but may be of any suitable material, including concrete, steel or fiberglass. The mast 12 may also be of any selected cross section, including circular or square. The mast 12 has a proximate end 34 and an opposite distal end 36, the distal end 36 capable of supporting an electrical component 38 and the proximate end 34 mounted to the foundation 14. The electrical component 38 may be a standard street lamp 40, a high-watt high mast lighting system (not shown), or other desired device. An electrical cable 42 connects the electrical component 38 to a distribution component assembly 44 (see FIG. 2). The electrical cable 42 is preferably sized for standard mast height at 14–3 SOW and runs the length of the mast 12 through its hollow interior. Other embodiments of the electrical cable may be utilized, including commercially available mast lighting cables (not shown), or even a simple 3 wire cable having 14 gauge conductors (not shown).

Figure 3:
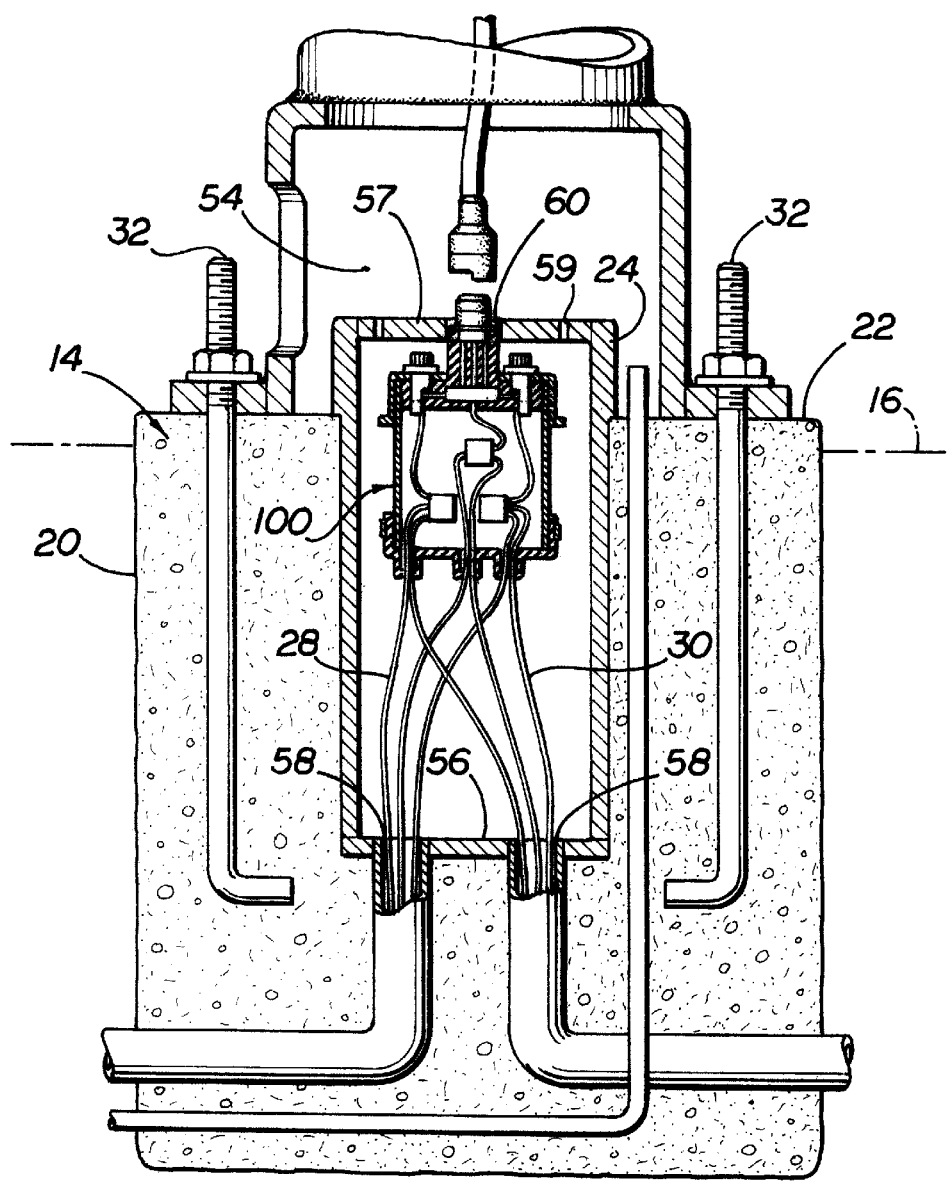
FIG. 3 is a vertical cross-sectional view of an embodiment of the improved mast lighting system, detailing the foundation and the casing.

Referring now to FIG. 3, the central conduit 24 within the pedestal 20 and any anchor bolts 32 or other protective device that protrude above the upper surface 22 of the pedestal 20 define a chamber 54 within the foundation 14. The distribution component assembly 44 is located within that chamber 54, such that no portion of the distribution component assembly 44 protrudes above the horizontal plane marked by the highest point of the foundation 14. In the illustrated embodiment, the top of the anchor bolts 32 define the highest part of the foundation 14. Location of the distribution component assembly 44 within the foundation 14 thus provides optimal protection from side impact damage due to traffic accidents or other collisions.

In one embodiment, the central conduit 24 may be constructed of pressure treated cylindrical PVC tubing or galvanized rigid steel piping of 6" diameter. In this embodiment, the central conduit 24 is closed at its bottom end by a base 56, having access holes 58 therethrough to allow passage of the incoming and outgoing feeder wires 28, 30 into the chamber 54. The base 56 thus forms the lower boundary of the chamber 54. Horizontal rebar (not shown) may be provided through the central conduit 24 and extending into the surrounding pedestal 20 for securing the central conduit 24 to the pedestal 20 after the concrete sets. A top retaining cap 57 with one or more weep holes 59 and a centrally disposed connector hole 60 therethrough to accommodate an electrical connector 62 may be provided to enclose the upper end of the central conduit 24. The retaining cap 57 may be attached to the central conduit 24 by complementarily threaded engagement between the retaining cap 57 and the central conduit 24. Alternatively, the retaining cap 57 may be omitted, or alternate means of engagement of the retaining cap 57 to the central conduit 24 may be provided.

Figure 2:
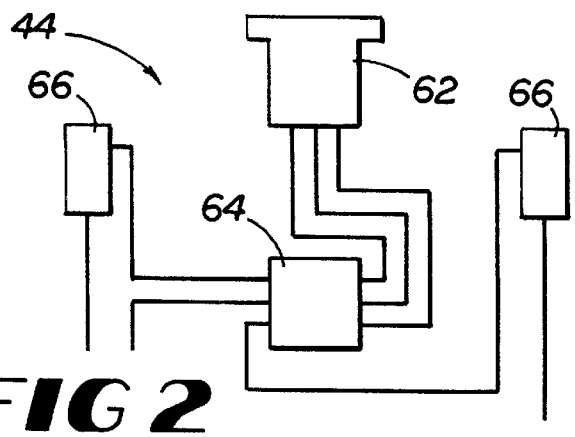
FIG. 2 is a wiring schematic of an embodiment of the distribution component assembly.

Referring now to FIG. 2, the distribution component assembly 44 includes, in one embodiment, a surge arrestor 64 and one or more fuses 66. In the illustrated embodiment, two fuses 66 are included, one on each side of an electrical connector 62 which connects the distribution component assembly 44 to the electrical cable 42. Individual components may be connected via standard wiring, with or without the use of contact blocks (not shown) mounted to a board (not shown). Standard fuses may be utilized, whether free standing or contained in an integrated externally accessible fusing assembly, described in further detail below.

Commercially available components from a variety of manufacturers may be utilized in the distribution component assembly 44, such as fast-acting type axial fuses from Littelfuse, Inc., and surge arrestors manufactured by Colomer, Inc. (including its 32 mm P/N D78 ZOV551 RA620).

The mast 12, near the proximate end 34 which is mounted to the foundation 14, defines an opening or handhole 70, through which the chamber 54 is accessible by the user. The handhole 70 may extend through the main body 72 of the mast 12 itself, or through a breakaway base portion 74 of the mast 12 at its proximate end 34. The location of the opening or handhole 70 should be near enough to the foundation 14 and chamber 54 therein that the distribution component assembly 44 is accessible by hand to maintenance or installation personnel, thereby simplifying routine maintenance and repair to be performed on the mast lighting system 10. The handhole 70 may be covered between repairs or maintenance by a cover or door (not shown).

Referring again to FIG. 1, in one embodiment, the electrical connector 62 between the distribution component assembly 44 and the electrical cable 42 is a watertight breakaway connector set 76, including a watertight female inlet 78 and a watertight male plug 80. In one embodiment, the female inlet 78 is connected to the distribution component assembly 44, and the male plug 80 is connected to the electrical cable 42. The breakaway connector set 76 preferably disengages under tension, such as when a mast 12 fails due to vehicular impact. In any event, the tensile force required to disengage the breakaway connector set 76 is less than the tensile force necessary to damage the electrical cable 42, the breakaway connector set 76 or electrical connections thereto. The breakaway connector set 76 may utilize a positive key alignment to reduce the chance of equipment damage due to mismatching. When the breakaway connector set 76 is properly mated and locked, it preferably forms an enclosure which meets the requirements of Nema 4-4X, 6-6P, plus IP 67.

Use of a breakaway connector set 76 in the mast lighting system 10 prevents broken wires and de-energization of a complete circuit when one component such as a mast 12 fails. The breakaway connector set 76 separates safely under tension, eliminating danger and electrical shock. When it comes time to replace a failed mast 12, the existing electrical cable 42 can be re-used or replaced without replacing the underground feeder wires 28, 30, distribution component assembly 44 or the breakaway connector set 76. A Nema 6, IP 67 rated breakaway connector set 76, which is rated for 15 amps, 480 volts, and which safely disengages under a tension of 7.5 lb is preferably employed. Sure Seal Connections from ITT Canon (P/N 120-1869-000 and 120-1870-000) have been utilized and found to be suitable for use in an embodiment of the breakaway connector set 76.

Figure 4A:
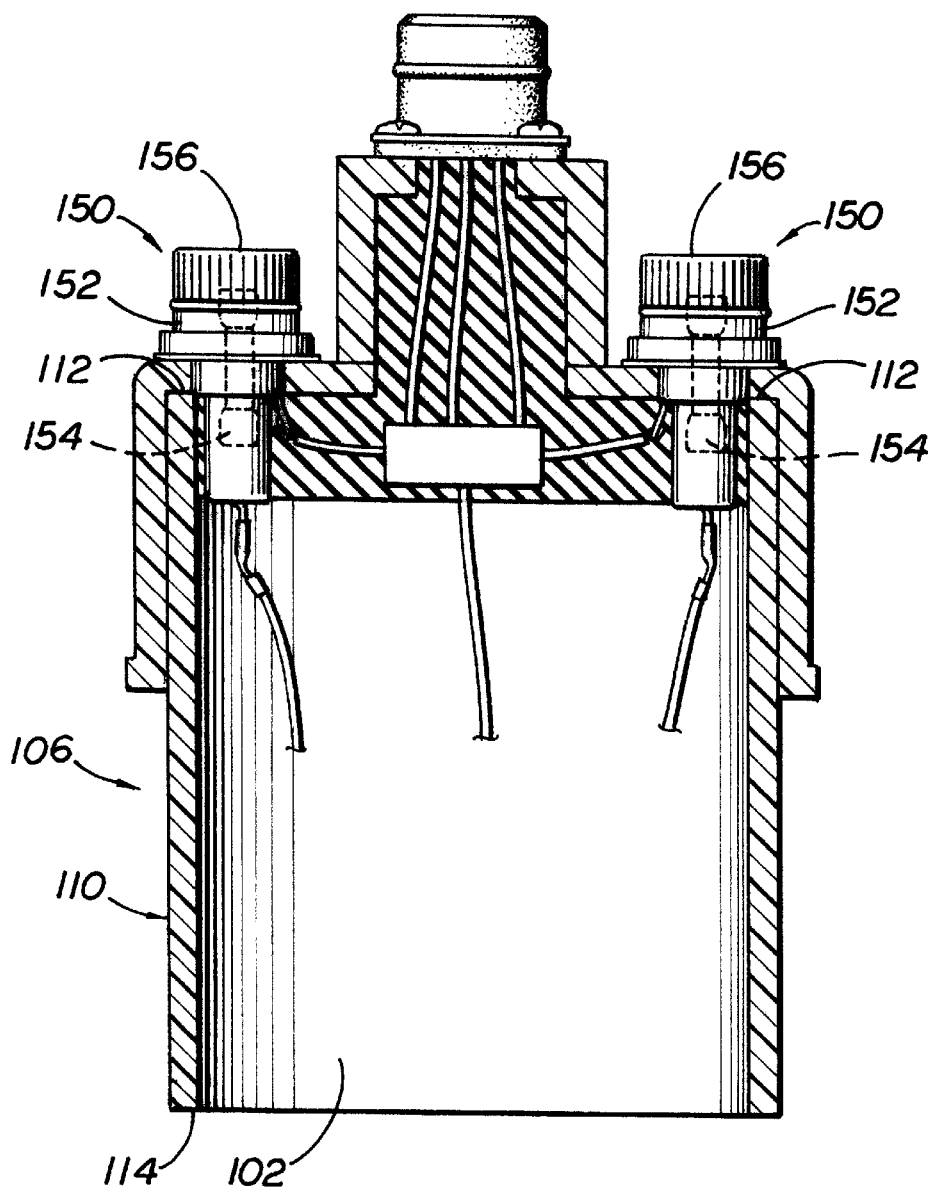
FIG. 4A is a vertical cross-sectional view of an embodiment of the pot.
Figure 4B:
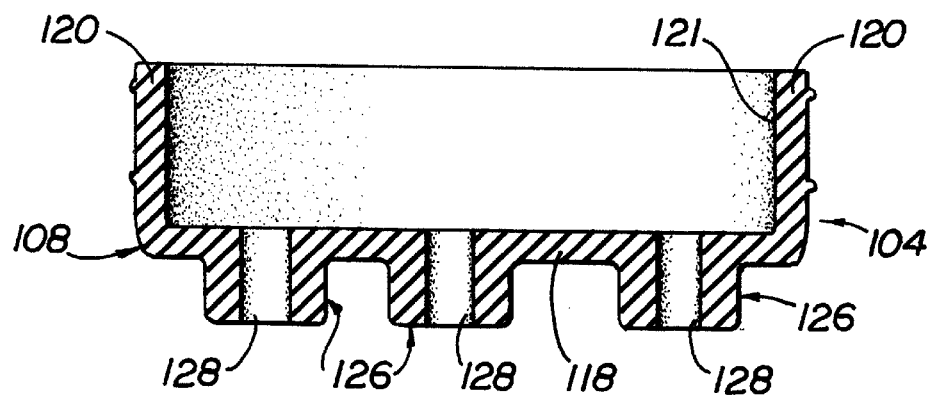
FIG. 4B is a vertical cross-sectional view of an embodiment of the cap.

In one embodiment, shown in FIG. 3, a casing 100 is provided within chamber 54, the casing 100 defining a space therein capable of enclosing the distribution component assembly 44. The casing 100 may be watertight, such that unwanted moisture and corrosive effects on the distribution component assembly 44 are minimized. A selected one of the male plug 80 or female inlet 78 is electrically connected to the distribution component assembly 44 and may be mounted on the casing 100. Referring to FIGS. 4A and 4B, the casing 100 defines an aperture 102 therein, and includes a closure member 104 which covers the aperture 102 and provides a watertight seal.

Figure 4C:
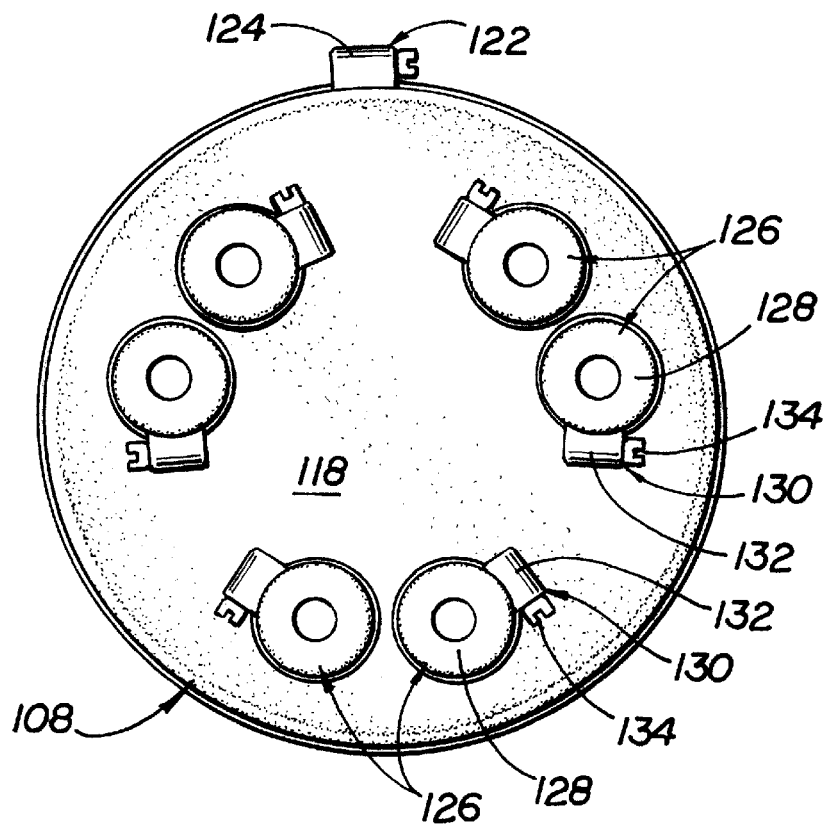
FIG. 4C is a bottom plan view of an embodiment of the cap.

The casing 100 may be of any desired shape. In one embodiment, the casing 100 is made up of a pot 106 having the aperture 102 therein, and, as seen in FIGS. 4B and 4C, a cap 108 which makes up the closure member 104, covering and sealing the aperture 102. The pot 106 has a substantially cylindrical body 110 having a closed end 112 and an opposite open end 114 which defines the aperture 102. The cylindrical body 110 may be fabricated of 4" diameter PVC tubing, sealed at the closed end 112 with a PVC cover 116 sealed to the tubing with epoxy or other watertight adhesive (not shown). The distribution component assembly 44 is contained within the pot 106 and is accessible through the aperture 102. Such an embodiment of the casing 100, when inserted into the chamber 54 with the open end 114 facing downward, forms a natural air pocket in the sealed interior of the casing 100. This air pocket acts as a back-up to the cap 108, which provides an air-tight seal around the open end 114 of the enclosure. In any event, the casing 100 should be of sufficient outside dimensions to fit within the interior of the chamber 54.

When the distribution component assembly 44 is placed within the pot 106 or other embodiment of the casing 100, it may be secured therein and further insulated from water or contaminants by "potting" the distribution component assembly 44 within the pot 106. A settable epoxy material (not shown) may be poured into the pot 106 and surrounding the distribution component assembly 44, such that only lead wires for connection to the electrical feeder wires 28, 30 protrude from the hardened epoxy.

Referring now to FIGS. 4A, 4B and 4C, the cap 108 is sized to fit over the open end 114 of the pot 106, and is capable of sealingly engaging the open end 114. The cap 108 is made up of a generally round member 118 having a continuous shoulder 120 extending around the circumference of the round member 118, and complementarily sized to be capable of sealingly receiving the open end 114 of the pot 106. In one embodiment, the cap 108 contains two seals (not shown) on the inner diameter 121 of the shoulder 120 which contact the open end 114 of the pot 106, for double protection against water and moisture penetration. A clamping mechanism 122, such as a stainless steel hose clamp 124, may be attached over the cap 108 and tightened to provide a water tight seal. Alternately, any construction of the cap 108 which provides a water tight seal may be utilized, such as a threaded engagement with the cylindrical body 110 of the pot 106. The cap 108 may be constructed of rubber or other resilient materials, including flexible PVC resin.

The casing 100 defines a plurality of ports 126 therethrough, each capable of sealingly engaging the incoming and outgoing feeder wires 28, 30 passing therethrough, providing watertight access for incoming and outgoing feeder wires 28, 30. In one embodiment, the plurality of ports 126 are disposed on the cap 108. In such a configuration, each port 126 is defined by a resilient sleeve 128, having a clamp 130 extending therearound, such as a stainless steel hose clamp 132, which may be tightened to constrict the sleeve 128 to sealingly engage a feeder wire 28, 30. The clamp 130 may be secured with one bolt 134 for easy access. While not required, construction of the ports 126 with a resilient material such as rubber or flexible PVC resin is beneficial, as a watertight seal is made possible with a wide range of feeder wire diameters. In turn, use of parts having a single selected port diameter is made possible in a wider range of installation environments. Resilient ports 126 with a 0.375" inner diameter, which are capable of sealingly engaging wire diameters between #10 AWG THHN 0.162" nominal outside diameter) and #2 AWG THHN 0.381 nominal outside diameter) have been utilized and found to be desirable.

Figure 5:
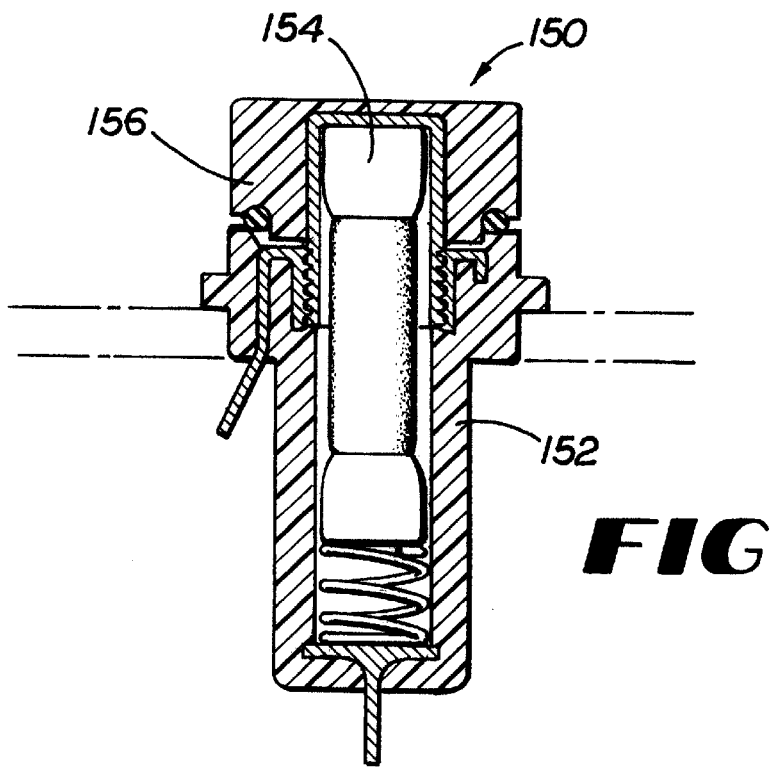
FIG. 5 is a vertical cross-sectional view of an embodiment of an external fuse.

Referring now to FIGS. 4A and 5, the casing 100 may further provide watertight and externally accessible fusing for the distribution component assembly 44. One or more external fuses 150 may be provided in the casing 100, each including a fuse port 152, capable of receiving a fuse 154 therein. The fuse port 152 provides electrical connection to the distribution component assembly 44 when a fuse 154 is inserted therein and a corresponding fuse cap 156 is affixed in place. The fuse cap 156 may be constructed to sealingly engage the fuse port 152 when installed, such that electrical connection and a watertight seal are maintained. The engaging means may include a threaded connection, a snap-in connection, a magnetic connection, or other selectively detachable connections capable of providing and maintaining a watertight relation between the fuse port 152 and fuse cap 156.

Referring again to FIG. 3, in one embodiment, two external fuses 150 are provided, each on the casing 100 and accessible from the outside of the casing 100. By providing external access to the fuses 154 within the distribution component assembly 44, failed fuses 154 may be replaced with a minimum of effort and maintenance. Further, no splicing of wires is required for fuse replacement, nor is dismantling of the casing 100 required. Suitable external fuses 150 are commercially available from several manufacturers, including catalog number HPF-WT, rated at 30 amps, 600 volts, from Bussman, Inc. in St. Louis, Mo.

In another embodiment, a waterproof built-in "breakaway" fuse kit design (not shown) is molded and wired into the female side of the electrical breakaway connector. The breakaway fuse design prevents broken wires and the de-energization of a complete circuit when one component, such as a mast 12, fails due to vehicular impact. The waterproof breakaway fuse kits separate safely under tension, retaining the fuse in the harmless load side, eliminating danger and electrical shock. Spring loaded socket contacts maintain the integrity of the breakaway connection by compensating automatically for thermal expansion due to standard loading cycling. These waterproof breakaway fuse kits may be designed specifically for highway lighting, area lighting, flood lighting, and power distribution circuits. The fuses will accommodate a wire range of #14 to #1/0 AWG. All fuse kits are rated for 30 amp, 600 volts. Suitable fused breakaway connector kits are available from Buchanan Construction Products, Inc., 101 Bilby Road, Hackettstown, N.J. 07840.

Also according to the invention, an improved method of constructing a mast lighting system 10 is now disclosed. According to the method, a chamber 54 is formed within the foundation 14 of sufficient dimensions to receive the distribution component assembly 44 therein. The distribution component assembly 44 is then disposed within the chamber 54, such that no portion of the distribution component assembly 44 protrudes above the horizontal plane formed by the uppermost part of the foundation 14. The power source is then electrically connected to the distribution component assembly 44, and distribution component assembly 44 is electrically connected to the electrical cable 42.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

What I claim is:

1. An improved mast lighting system including at least one mast having a proximate end and an opposite distal end, the distal end capable of supporting an electrical component and the proximate end mounted to a foundation that has at least a portion extending into the ground, an electrical cable within the mast connecting the electrical component to a distribution component assembly through an electrical connector, and a power source connected to the distribution component assembly, the improvement comprising:
    a. the foundation having a chamber therein of sufficient dimensions to receive the distribution component assembly therein;
    b. the distribution component assembly being disposed within the chamber;
    c. the mast defining an opening therein adjacent the proximate end, the opening being in communication with the chamber whereby the distribution component assembly is accessible by the user through the opening; and
    d. a casing defining a space therein containing the distribution component assembly,
    wherein the electrical connector comprises a breakaway connector having a male plug and a female socket, and wherein the tensile force required to disengage the connector is less than the tensile force necessary to damage the electrical cable, the breakaway connector or electrical connections thereto.

2. The apparatus of claim 1 wherein a selected one of the plug or socket of the breakaway connector is on the casing and electrically connected to the distribution component assembly.

3. The apparatus of claim 2, wherein the casing is located within the foundation.

4. The apparatus of claim 2, the casing having at least one fuse port on the casing, the fuse port capable of receiving a complementary fuse cap containing a fuse therein and electrically connected to the distribution component assembly.

5. An improved mast lighting system including at least one mast having a proximate end and an opposite distal end, the distal end capable of supporting an electrical component and the proximate end mounted to a foundation that has at least a portion extending into the ground, an electrical cable within the mast connecting the electrical component to a distribution component assembly through a breakaway connector comprised of a first connection and a second connection, and a power source connected to the distribution component assembly, the improvement comprising:
    a. the foundation having a chamber therein of sufficient dimensions to receive the distribution component assembly therein; and
    b. a casing defining a space therein capable of receiving therein the distribution component assembly and having a selected one of the first or second connection disposed on the casing.

6. The apparatus of claim 5, the casing defining an aperture therein and a closure member capable of selectively engaging the aperture in a sealing, watertight manner.

7. The apparatus of claim 6, wherein the casing comprises a pot defining the aperture therein, and wherein the closure member comprises a cap which covers the aperture.

8. The apparatus of claim 7, the pot comprising a substantially cylindrical body having a closed end and an opposite open end defining the aperture, the distribution component assembly being disposed within the pot and accessible through the aperture.

9. The apparatus of claim 8, the cap comprising a generally round member having a continuous shoulder extending around the circumference thereof, complementarily sized to be capable of sealingly receiving the open end of the cylindrical body therein.

10. The apparatus of claim 9, wherein the cap further comprises a resilient material.

11. The apparatus of claim 6, the casing defining a plurality of ports therethrough, each capable of sealingly engaging an insulated wire passing therethrough.

12. The apparatus of claim 8, wherein the cap defines a plurality of ports therethrough, each capable of sealingly engaging an insulated wire passing therethrough.

13. The apparatus of claim 12, the each port comprising a resilient sleeve and further comprising at least one clamp disposed on the sleeve to selectively constrict the port to sealingly engage the insulated wire.

\* \* \* \* \*